June 17, 1969  L. PERAS  3,450,865
METHODS AND DEVICES FOR GENERATING A CURVE
Filed Jan. 29, 1963  Sheet 1 of 2
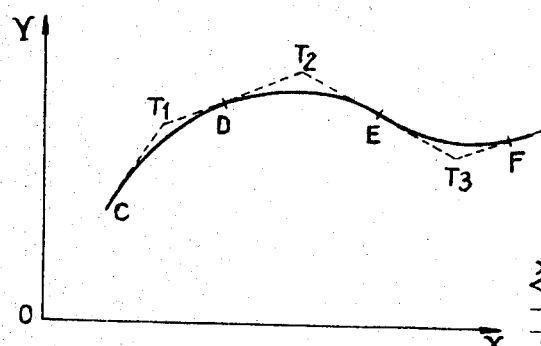
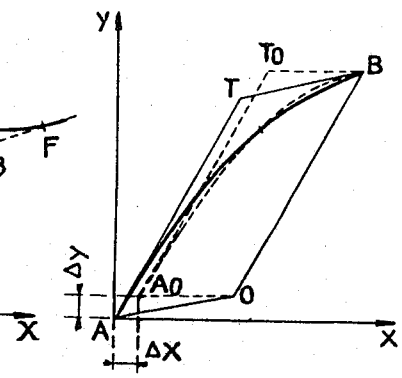
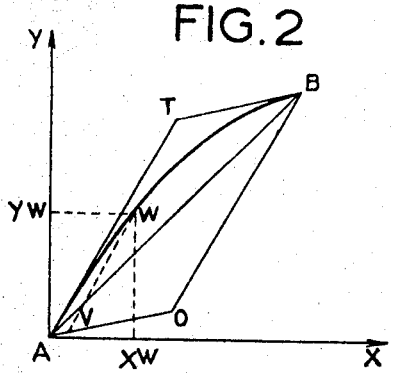
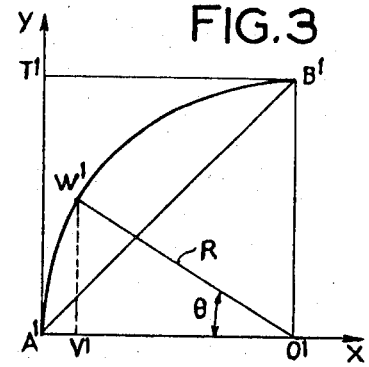
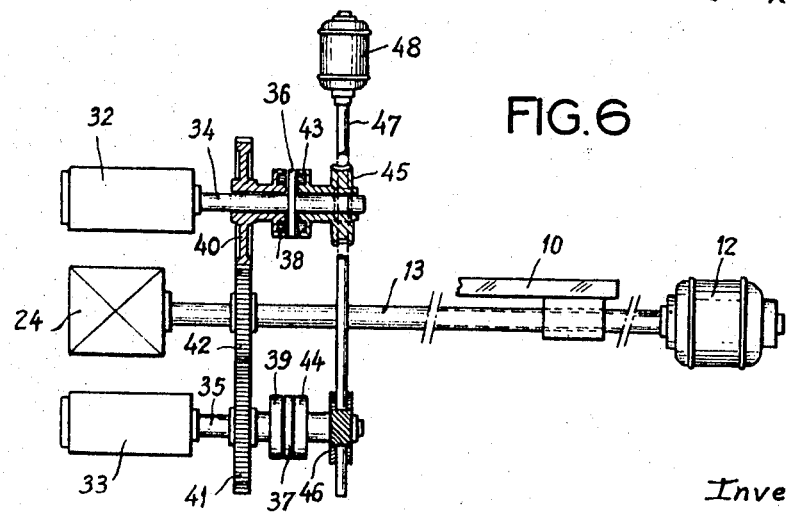
Inventor
Lucien Peras
Stevens, Davis, Miller & Mosher
Attorneys Inventor
Lucien Peras Attorneys United States Patent Office 3,450,865
Patented June 17, 1969

3,450,865
METHODS AND DEVICES FOR GENERATING A CURVE
Lucien Peras, Billancourt, France, assignor to Regie Nationale des Usines Renault, Billancourt, France
Filed Jan. 29, 1963, Ser. No. 254,641
Claims priority, application France, Dec. 3, 1962, 917,397
Int. Cl. G06f 15/46; G06k 11/02
U.S. Cl. 235—61.7                                7 Claims Curve generating machines, whether of the tracing or machining type, are already known. Some of these machines require firstly a very accurate tracing of the curve which is subsequently read through an optical system associated with magnetic recording means, and finally returned to the machine. However, this method requires the assistance of very skilled labour for tracing the curve and on the other hand the time necessary to perform the work is relatively long.

Other machines are based on the principle of numerical control and operate from an initial document or record giving the coordinates of the successive points of the curve, this document being prepared by an arithmetical computer or calculating machine to which the curve definitions are supplied.

Except for special purposes, the cost of a machine incorporating a computer or calculating mechanism is extremely high. If a separate computer is used, the latter is not always available and this is particularly awkward when it is desired to correct a tracing rapidly. Moreover, even if a separate computer is used the cost of the machine and of its operation is particularly high.

It is the essential object of the present invention to provide a method of generating a curve whereby the above-listed drawbacks are eliminated, this method comprising the following steps, after the curve has been determined by setting out a number of data corresponding to elementary arcs of said curve:

Successively recording the data of said elementary arcs in a numerical system,

For each elementary arc, applying these data to an analogical computer and causing the computer, in order to control in a manner known per se a tracing system, to generate the magnitudes representing the coordinates of the successive points of said elementary arc from a parametric equation of curve of which the terms include the data of the points defining said elementary arc, Measuring and comparing the data of the point attained upon completion of the tracing of an elementary arc with the recorded data which are to be obtained theoretically, And finally introducing into the analogical computer the differences resulting from this comparison in order to compensate said differences in the process of generating the next elementary arc.

It will be noted that with this method the use of a complex arithmetical computer is avoided by resorting to an analogical computer incorporated in the device controlling the curve generation so that said analogical computer is constantly available. On the other hand, by generating the complete curve through a succession of elementary arcs wherein the measured discrepancies are constantly measured, the precision of the result is particularly satisfactory without necessitating in this case an arithmetical computer and a very accurate control system, which are both very expensive.

A typical form of embodiment of the invention will now be described with reference to the accompanying drawings.

In the drawings:

FIGURE 1 is a diagram showing a typical curve to be generated, which is taken as an example;

FIGURES 2 and 3 are two diagrams showing firstly one fraction of the curve to be generated and secondly the basic curve from which the curve section of FIG. 2 is obtained by anamorphosis;

FIGURE 4 is a diagram showing one section of the curve to be generated, to illustrate the compensation of any discrepancy appearing at the end of the tracing of the preceding curve section;

FIGURE 6 is a detail view showing a specific mounting of this equipment, and

Figure 5:
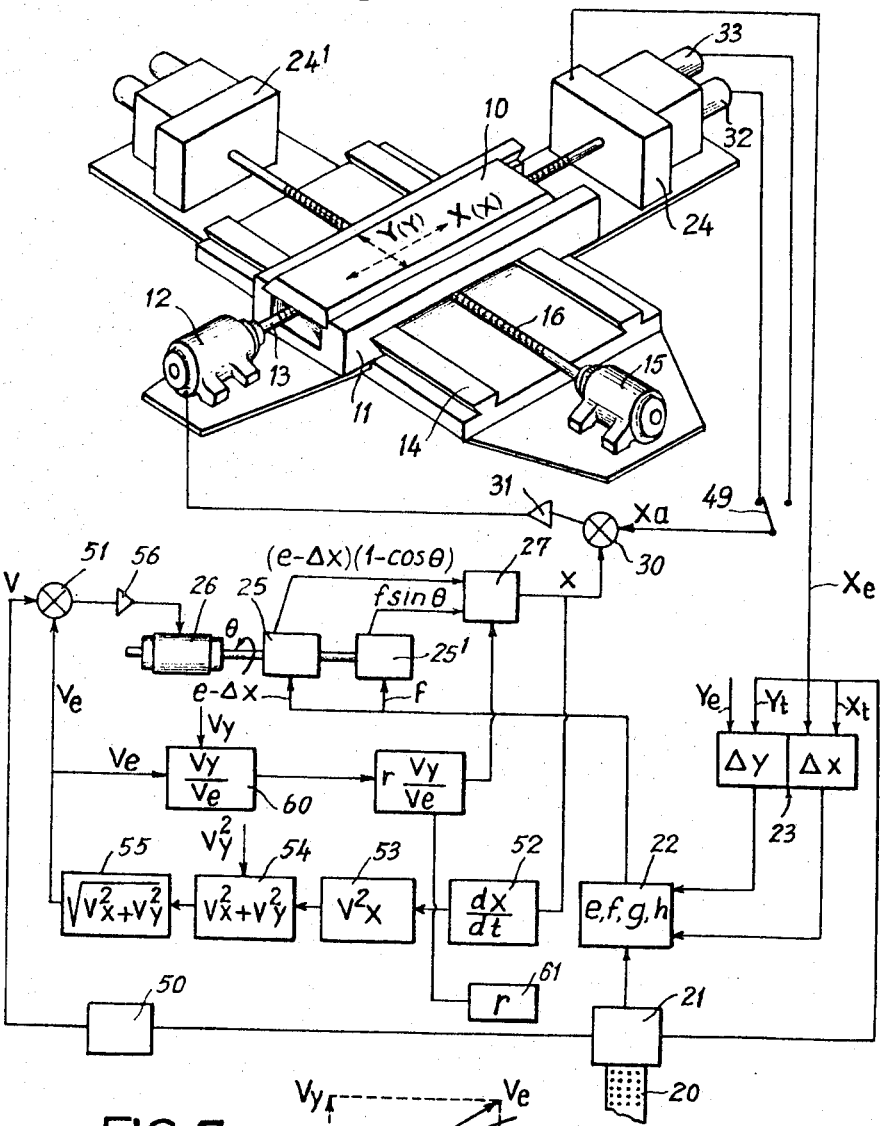
FIGURE 5 is a simplified and block diagram showing the principle of an equipment for carrying out the method of this invention.

In the method of this invention a curve to be generated is considered as a succession of elementary arcs which may be taken for example within the range of moderate variation of their radius of curvature, unless certain variations in the radius of curvature are desired, this alternative being permitted by the method of this invention.

The curve to be generated may thus be defined by a number of points, and a preferred solution in this case consists in defining the curve beforehand by its tangents at predetermined points constituting an enveloping polygon of the curve, this tangent selection being advantageous notably as far as the merging of the elementary arcs into one another is concerned.

As shown in FIG. 1, each elementary arc is defined by its endmost points CD, DE, EF and by its tangents to the curve at these points, these tangents being constructed from their points of intersection $T_1$, $T_2$, $T_3$, and it is obvious that these data can be obtained without resorting to an accurate tracing. Moreover, each elementary arc may be obtained by anamorphosis from a basic curve, the choice in this specific case being subordinate to the necessity of tracing a curve as satisfactory as possible by means of an analogical computer as simple as possible.

A preferred but not limiting solution of this problem, with due regard for the foregoing, consists in taking as a basic curve the quarter circle and as anamorphosis the oblique projection, this leading to a parametric equation easy to convert or transduce through an analogical method as will be explained presently.

This solution is illustrated by the examples of FIGS. 2 and 3. FIG. 3 shows that a parallelogram ATBO (which may be considered as an oblique projection of the square A'T'B'O' shown in FIG. 3) may be constructed from points AB of one curve section and from the tangents AT and BT at these points, with $A'B'=AB$, this curve section AB being also considered as the oblique projection of the quarter circle with centre O' and radius R intersecting A'B'.

The parametric equation of this quarter circle, taking A' as the origin in FIG. 3, is:

$$x = R(1-\cos\theta)$$
$$y = R\sin\theta$$

From FIGS. 2 and 3 in which W and W' designate a current point of the curves which is projected at V' on A'O' and at V on AO, we have:

$$AV = TB(1-\cos\theta)$$

and $$VW = AT\sin\theta$$

As a consequence, the parametric equation of arc AB, i.e., of the current point W in the system of coordinates $x, A, y$ of FIG. 2, is:

$$x_W = (X_B - X_T)(1-\cos\theta) + (X_T - X_A)\sin\theta$$
$$y_W = (Y_B - Y_T)(1-\cos\theta) + (Y_T - Y_A)\sin\theta$$

Therefore, any complementary arc such as AB may be determined by means of this parametric equation by varying $\theta$ to O to $\pi/2$, knowing the coordinates of A, B and T. This equation must further be completed for introducing into the tracing of an elementary arc, as already explained, a compensation of the possible discrepancy appearing at the end of the tracing of the preceding arc between the point actually attained and the point which should be attained theoretically. This case is illustrated in an obviously exaggerated manner in FIG. 4, assuming that the arc is to be traced from the point $A_o$ having with respect to the theoretical origin A the algebraic differences $\Delta_x$ and $\Delta_y$.

Then, if desired, BT may be left unchanged and $A_o$T substituted for AT, thus giving to the above parametric equation the following complete formula:

$$x_W = (X_B - X_T)(1 - \cos\theta) + (X_T - X_A - \Delta_x)\sin\theta$$
$$y_W = (Y_B - Y_T)(1 - \cos\theta) + (Y_T - Y_A - \Delta_y)\sin\theta$$

It is also possible to contemplate a variation of the position of point T by taking a tangent $A_o T_o$ equivalent to AT as shown in FIG. 4. In this case the equation takes the following formula:

$$x_W = (X_B - X_T - \Delta_x)(1 - \cos\theta) + (X_T - X_A)\sin\theta$$
$$y_W = (Y_B - Y_T - \Delta_y)(1 - \cos\theta) + (Y_T - Y_A)\sin\theta$$

which, when put down, gives:

$$e = X_B - X_T$$
$$f = X_T - X_A$$
$$g = Y_B - Y_T$$
$$h = Y_T - Y_A$$

This last parametric equation of the elementary arcs, when applied in the installation describes hereunder, becomes:

$$x_W = (e - \Delta_x)(1 - \cos\theta) + f\sin\theta$$
$$y_W = (g - \Delta_y)(1 - \cos\theta) + h\sin\theta$$

In the equipment shown diagrammatically in FIG. 5, the method of this invention is applied by way of example to the conventional case of a machine comprising two carriages 10 and 11 to which composite perpendicular movements are imparted, these carriages being movable in relation to an element, for example a tool (not shown), for generating a curve by machining a material (not shown). The carriage 10 is displaceable on the carriage 11 by means of a motor 12 solid therewith and connected to the carriage 10 through a screw and nut drive of which the screw is visible at 13. The carriage 11 is displaceable on fixed slideways 14 by means of a motor 15 solid therewith and also connected to the carriage 11 through a screw and nut drive of which the screw is visible at 16. In this example it is assumed that carriage is displaceable according to function $x$ and carriage 11 according to function $y$ of the above-defined parametric equation.

To simplify the disclosure only the control means (not shown in the drawings) of carriage 10 operated according to function $x$ will be described completely, it being understood that the control means of carriage 11 corresponding to function $y$ are of similar construction.

In this equipment, the reference numeral 20 designates the order tape (perforated or magnetic tape, for instance) on which the data corresponding to the different elementary arcs constituting the curve are recorded in succession. Preferably, these data are the aforesaid elements $e$, $f$, $g$, $h$ which may be calculated beforehand by means of a simple accounting machine from coordinates of the curve points selected in the manner set forth hereinabove, although this calculus may also be made by means of a computer after reading the tape if it is desired to record thereon only the coordinates of the aforesaid points as the coordinates of the curve.

However, with the successive elements $e$, $f$, $g$, $h$ the tape carries nevertheless the inscription of the coordinates of the final points of the selected elementary arcs.

A device 21 for reading tape 20 is also provided. This device 21 is connected on the one hand to an arithmetical-analogical transformer 22 in which the data $e$, $f$, $g$, $h$ of the elementary arcs are introduced when each arc is to be calculated, these data being converted in the known manner into analogical magnitudes.

On the other hand, the reading device 21 is connected to an arithmetical comparator of a type known per se, as illustrated diagrammatically at 23, wherein the data $X_t$, $Y_t$ of the final points of the elementary arcs inscribed on the tape are compared (after completing the tracing of each section arc) with the data $X_e$, $Y_e$ delivered by the transducers 24, $24^1$ of the position of carriages 10, 11, these transducers being of any known and suitable type and actuated from the carriage drive screws 13, 16.

This comparator 23 is further connected to the arithmetical-analogical transformer 22 to which it delivers the elements $\Delta_x$ and $\Delta_y$ to be used with the data $e$, $f$, $g$, $h$, for determining the electrical analogical magnitudes delivered by this transformer.

Now it will be noted that the position transducers 24, $24^1$ should have a degree of precision comparable with that of the coordinates recorded on the tape 20 and that as the $\Delta_x$ and $\Delta_y$ are relatively very low, as a rule it is sufficient to limit the comparison at 23 of the least or last and penultimate significant figures of the coordinates inscribed with those delivered by the transducers, whereby only relatively simple reading and comparator means are required for this purpose.

In order to generate the function $x$ of the selected parametric equation, the arithmetical-analogical transformer 22 delivers electrical magnitudes corresponding to $e - \Delta_x$ and to $f$ to solving devices 25, $25^1$ of known design, the parameter $\theta$ being introduced into these solving devices with the assistance of a motor 26, that is, in this example as the generation of each function $(1 - \cos\theta)$ and $\sin\theta$ affecting the terms $e - \Delta_x$ and $f$ is obtained for example in a known manner in said solving devices by means of transformers having a rotary primary winding. The results delivered by these solving devices are added at 27 and constitute in this case an electrical magnitude corresponding to: $x = (e - \Delta_x)(1 - \cos\theta) + f\sin\theta$.

This magnitude is delivered to a comparator 30 to which is also connected a system for transducing the position $x_a$ of carriage 10, this comparator 30 co-operating in a conventional manner well known in the field involved, with the motor 12 of this carriage of which it controls the speed as a function of the difference signal appearing at its output, this signal being amplified at 31. The system for transducing the position of carriage 10 connected to comparator 30 may be of any known analogical type, but here it is necessary to reset it to zero after each generation of an elementary arc of the curve, that is, each time the parameter $\theta$ introduced by the motor 26 attains the value $\pi/2$, this final portion of the operation being utilized for causing the introduction of fresh data concerning the next arc, that is, new magnitudes $e$, $f$, $g$, $h$, $\Delta_x$ and $\Delta_y$ taken from the order tape 20 and from the arithmetic comparator 23.

Since it is desirable that this resetting position of the analogical transducer system controlling the position of carriage 10 takes place immediately, the immediate availability of a transducer in the zero position may be obtained by using two transducers such as 32 and 33 which are operatively connected by turns the one with the carriage drive screw and the other with a resetting motor, as shown in FIG. 6. In this figure, the reference numeral 13 designates the carriage drive screw, the drive motor of this carrage being shown at 12, and the screw-driven position transducer of arithmetical type is designated by the reference numeral 24. The two analogical transducers 32, 33 comprise each a drive shaft 34, 35, respectively, each shaft carrying a clutch disc 36, 37 mounted between two clutch plates so that they can be rotatably connected with one of the other plate under the control of electromagnetic or other means.

The clutch plates 38, 39 disposed on the same side of the discs 36, 37 are solid with pinions 40, 41 respectively in meshing engagement with a common pinion 42 solid with the screw 13. Clutch plates 43, 44 located on the opposite side of discs 36, 37 are rotatably solid with worm gears 45, 46 respectively, each worm gear 45, 46 being in driving engagement with a corresponding tangent worm 47 driven from a motor 48 controlling the resetting of the various transducers to zero. Thus, one of the transducers may be operatively connected to the carriage drive screw and the other with the resetting motor 48, a reversing control gear of suitable type (not shown) permitting the reversal of these driving connections, this reversing control gear being connected to the reversing switch 49 shown in FIG. 5 which is intended for interconnecting the comparator 30 with the specific one of transducers 32 or 33 which at that time is connected to the carriage drive screw.

To determine the function $y$ from the element $g$, $h$, $\Delta_y$ delivered by the transformer 22, the corresponding solving devices (not shown) are also driven from the aforesaid motor 26.

On the other hand, in the case of a machining arrangement the relative speed of the tool and of the workpiece should be substantially constant, and in this case this speed may be adjusted by varying the angular velocity of parameter $\theta$, that is, the velocity of motor 26 generating this parameter. However, it will be noted that this adjustment is not absolutely necessary in the case of the application of the present invention to the simple tracing of a curve.

This velocity adjustment may be obtained as illustrated in FIG. 5. To this end, on the one hand, the desired relative speed V of the tool and workpiece is recorded on the order tape 20 and delivered through the reading device 21 to an arithmetic-analogical transformer 50 and thence to an analogical comparator 51 in which it is compared with the actual velocity of generation V$e$ of the curve calculated from the functions $x$ and $y$ generated in the corresponding solving devices.

Thus, between the solving devices for function $x$ and the comparator 30 an analogical calculating system is connected which comprises a solving device 52 for determining the speed $V_x$ at which function $x$ varies, that is, $dx/dt$, which is connected in turn to a solving device 53 squaring the thus determined speed to give $V^2_x$, this device having its output connected to the solving device 54 adding $V^2_x$ and $V^2_y$, it being understood that $V^2_y$ is also obtained from the solving devices for function $y$, solving device 54 being connected to another solving device 55 for determining $$\sqrt{V^2_x + V^2_y}$$

that is V$e$.

Comparator 51 may thus cause the speed of motor 26 generating the parameter $\theta$ to vary in a manner known per se as a function of the difference between V and V$e$ obtaining at the output, which in this case is amplified at 56 to control said motor.

Figure 7:
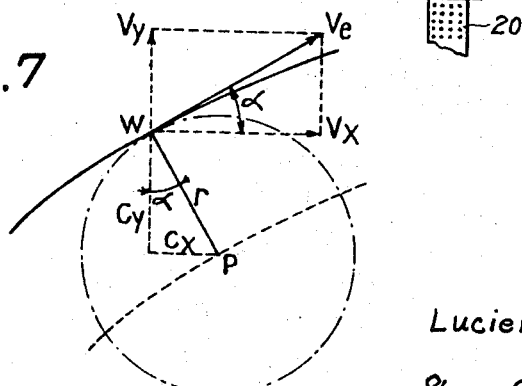
FIGURE 7 is a diagrammatic view illustrating the specific case of a curve generation directly by machining.

It will also be noted that in the specific case of tracing or machining notably by turning, the curve to be generated will be described directly by the tracing stylus or tool, whereas in the case of the machining by means of a rotary tool as illustrated in FIG. 7 (milling or grinding for instance) it is convenient to cause the center P of the tool to follow a path parallel to the desired curve and spaced therefrom by a distance $r$ corresponding to the radius of the tool.

In this case the coordinates of the moving point P may be deducted from those of the moving point W of the desired curve, in the following manner illustrated in FIG. 7:

$$x_p = x_w + C_x = x_w + r \sin \alpha = x_w + r\frac{V_y}{V_e}$$

$$y_p = y_w - C_y = y_w - r \cos \alpha = y_w - r\frac{V_x}{V_e}$$

The corrective terms $= r\dfrac{V_y}{V_e}$ for $x_w$ and $r\dfrac{V_x}{V_e}$ for $y_w$ correspond in this case to magnitudes which, in addition to the known tool radius $r$ are on the other hand already determined and used in the above-described speed regulating system. Thus, FIG. 5 shows how the corrective term for $x$, i.e.:

$$r\frac{V_y}{V_e}$$

is introduced into the analogical calculating system from which the function $x$ is issued at 27.

The magnitude V$e$ taken from the output of the solving device 55, as well as the magnitude $V_y$ taken at the output of the solving device of the $y$ chain which is equivalent to the solving device 52 of $V_x$, are delivered to another solving device 60 for determining $V_y/V_e$. This solving device 60 as well as a device 61 for transducing into an analogical magnitude the tool radius $r$, are connected to a solving device 62 for determining the product $$r\frac{V_y}{V_e}$$

which is subsequently added at 27 to the results obtained from the other solving devices 25 and 25$^1$ for function $x$.

Of course, all the elements of this control equipment, of which only a diagrammatic illustration is given herein, may be selected among the existing and conventional electrotechnical means as known to those conversant with the art, which may be combined as convenient without departing from the spirit and scope of the invention.

I claim:
1. An apparatus for generating a curve corresponding to a curve upon which a number of data corresponding to elementary arcs of the curve are derived in the form of coordinates of a limited number of points plotted on the curve, said apparatus comprising means successively recording in a digital system the data of said elementary arcs, tracing means, an analog computer controlling said tracing means, and feeding means feeding said data for each elementary arc from said recording means to said analog computer which generates the magnitudes representing the coordinates of successive points of said elementary arc from a parametric equation of an interpolation curve such that the terms of said equation comprise the data of the points defining said elementary arc, means for automatically sensing and measuring the data of the point attained by said tracing means upon completion of its tracing an elementary arc and measuring these data with values constituting the theoretical data, and compensating means coupling to said analog computer the difference signal resulting from said last mentioned means for compensating the generation of the next elementary arc.

2. An apparatus according to claim 1 wherein said analog computer generates said parametric equation in the form of an oblique projection of an arc of a curve having a given parametric equation to which oblique projection each elementary arc is assimilated.

3. An apparatus as set forth in claim 1 wherein each elementary arc is defined by its extreme points and by the point of intersection of its tangents at said points.

4. An apparatus as set forth in claim 1 wherein said first mentioned means includes a tape for recording numerical data corresponding to the successive elementary arcs of said curve, a tape reading device and said feeding means including an arithmetic analogical transformer, said reading device and transformer being interconnected and said transformer being furthermore connected to said analog computer, and, for each set of coordinates of the curve to be generated, said means for sensing measuring and comparing comprising an analogical comparator to which are connected said computer and an analog transducer for transducing the position of the movable tracing member corresponding to said set of data, said comparator co-acting in a known manner with a servomotor driving said tracing member, and further comprising a transducer for transducing the position of said movable member in order to determine the position thereof with a precision comparable with that of the data recorded on said tape, an arithmetical comparator to which are connected said last-named transducer and said reading device in order to measure the discrepancy between the position attained at the end of said elementary arc and the position to be attained theoretically, said comparator being connected to said arithmetical-analogical transformer with a view to compensate said possible discrepancy during the generation of the next elementary arc.

5. An apparatus according to claim 4, wherein said position transducer includes two transducers comprising connecting means adapted to be disconnected from the means driving said tracing member and from the resetting mechanism, which are provided for alternatively operating said transducers and resetting them to zero.

6. An apparatus according to claim 4, for particular use with machining apparatus, wherein the variation of the parametric equation adopted in said computer is introduced by the rotation of a motor, said motor having speed regulating means comprising a device for comparing the desired machining speed with the composite calculated speed taken at the output of said computer for each set of coordinates.

7. An apparatus according to claim 4, for particular use with machining means of a rotary tool, characterized in that for causing the center of said tool to describe a curve parallel to the curve to be generated there is added to said parametric equation corrective term signals introduced by an analog system comprising means corresponding to the tool radius and, for each set of coordinates, means corresponding to the velocity of generation in the other set of coordinates, and means representative of the actual curve generating speed, said analog system comprising solving devices for solving the ratio of the last two data aforesaid and their product by the tool radius, said last-named means being connected to the output of said computer which is representative of the corresponding set of coordinates of said parametric equation.

References Cited

UNITED STATES PATENTS

| | | | |
|---|---|---|---|
| 2,980,332 | 4/1961 | Brouillette | 235—189 |
| 3,004,166 | 10/1961 | Greene | 250—202 |
| 3,099,781 | 7/1963 | Herchenroeder | 318—162 |
| 3,159,743 | 12/1964 | Brouillette | 235—198 |

MAYNARD R. WILBUR, *Primary Examiner.*

THOMAS J. SLOYAN, *Assistant Examiner.*

U.S. Cl. X.R.

235—151.11, 189